United States Patent [19]
Rinehart et al.

[11] Patent Number: 5,827,608
[45] Date of Patent: Oct. 27, 1998

[54] METHOD OF FORMING A THERMOPLASTIC LAYER ON A FLEXIBLE TWO-DIMENSIONAL SUBSTRATE AND POWDER FOR PREPARING SAME

[75] Inventors: Ernest M. Rinehart, North St. Paul; Rafael M. Yasis, White Bear Lake, both of Minn.

[73] Assignee: Minnesota Mining and Manufacturing Company, St. Paul, Minn.

[21] Appl. No.: 738,517

[22] Filed: Oct. 28, 1996

[51] Int. Cl.⁶ .............................. C09D 5/46; C08L 27/12
[52] U.S. Cl. ...................... 428/332; 427/185; 427/195; 525/934; 428/402; 428/421
[58] Field of Search .................... 427/185, 195; 525/934; 428/332, 402, 421, 422

[56] References Cited

U.S. PATENT DOCUMENTS

| | | |
|---|---|---|
| 3,549,403 | 12/1970 | Williams et al. . |
| 3,561,003 | 2/1971 | Lanham et al. ........................... 106/22 |
| 3,821,066 | 6/1974 | Tillotson et al. . |
| 3,856,900 | 12/1974 | Erb . |
| 3,968,275 | 7/1976 | Dees, Jr. et al. . |
| 3,974,303 | 8/1976 | Iwase et al. . |
| 4,045,600 | 8/1977 | Williams . |
| 4,132,552 | 1/1979 | Van Paesschen et al. . |
| 4,141,873 | 2/1979 | Dohany . |
| 4,185,000 | 1/1980 | Gebauer et al. ..................... 260/42.27 |
| 4,242,380 | 12/1980 | Courtoy . |
| 4,255,462 | 3/1981 | Gebauer et al. ........................... 427/27 |
| 4,284,681 | 8/1981 | Tidmarsh et al. . |
| 4,286,021 | 8/1981 | Brendley, Jr. . |
| 4,556,589 | 12/1985 | Neumann et al. . |
| 4,605,592 | 8/1986 | Pacquette et al. . |
| 4,727,111 | 2/1988 | Pettit, Jr. et al. . |
| 4,767,821 | 8/1988 | Lindner et al. ............................. 525/72 |
| 4,770,939 | 9/1988 | Sietses et al. ............................ 428/402 |
| 4,898,779 | 2/1990 | Yoshimura et al. . |
| 4,910,046 | 3/1990 | Herwig .................................... 427/195 |
| 4,937,288 | 6/1990 | Pettit, Jr. et al. . |
| 4,977,221 | 12/1990 | Yoshimura et al. . |
| 5,021,297 | 6/1991 | Rhue et al. . |
| 5,030,394 | 7/1991 | Sietses et al. .............................. 264/28 |
| 5,041,287 | 8/1991 | Driggers et al. . |
| 5,108,836 | 4/1992 | Ocampo et al. . |
| 5,207,954 | 5/1993 | Lewis et al. .............................. 264/13 |
| 5,290,591 | 3/1994 | Lussi et al. . |
| 5,344,672 | 9/1994 | Smith . |
| 5,399,597 | 3/1995 | Mandel et al. .......................... 523/342 |

FOREIGN PATENT DOCUMENTS

| | | | |
|---|---|---|---|
| 0 259 290 | 3/1988 | European Pat. Off. .......... | B29B 7/88 |
| 0 272 659 | 6/1988 | European Pat. Off. . | |
| 0 294 968 | 12/1988 | European Pat. Off. ........ | C08L 27/12 |
| 0 440 840 | 2/1990 | European Pat. Off. ...... | C08F 255/02 |
| 0 456 018 A1 | 11/1991 | European Pat. Off. . | |
| 0 231 001 A1 | of 0000 | Germany ......................... | B05D 7/14 |
| 0 440 840 A3 | 8/1991 | Germany ..................... | C08F 255/02 |
| 44 27 085 A1 | 2/1996 | Germany ......................... | D06N 7/02 |

(List continued on next page.)

OTHER PUBLICATIONS

3M—THV Fluoroplastic Technical Information THV 500G.
JP 57 038 840 A (Sumitomo Chem Co Ltd) Abstract.
"Powder Application Methods and Equipment": *Powder Coating—The Complete Finisher's Handbook;* Chapter 10, pp. 82, 109–110.
"Powder Coating Materials"; *Powder Coating—The Complete Finisher's Handbook;* Chapter 3, pp. 12–19.

*Primary Examiner*—Daniel Zirker
*Attorney, Agent, or Firm*—Gary L. Griswold; John H. Hornickel

[57] ABSTRACT

A method of forming a thermoplastic layer on a flexible, two-dimensional substrate is provided. In the steps of the method, a thermoplastic powder is provided having a melt flow index of at least 0.008 grams/10 minutes, the powder is applied to at least one surface of the substrate to form a particle layer, and the coated substrate is subjected to elevated heat and pressure until particle layer is fused into a continuous layer and the continuous layer is bonded to the substrate. The invention also includes a powder for preparing the thermoplastic layer and a method of making the powder.

12 Claims, 2 Drawing Sheets

FOREIGN PATENT DOCUMENTS

| | | |
|---|---|---|
| 43-23337 | 10/1968 | Japan . |
| 44-30879 | 12/1969 | Japan . |
| 49-12849 | 3/1974 | Japan . |
| 57-58467 | 11/1975 | Japan . |
| 59-23541 | 4/1980 | Japan . |
| 58-20273 | 2/1983 | Japan . |
| 60-18536 | 3/1985 | Japan . |
| 60-198225 | 10/1985 | Japan . |
| 61-108539 | 5/1986 | Japan . |
| 62-271724 | 11/1987 | Japan . |
| 4-179545 | 6/1992 | Japan . |
| 1073044 | 6/1967 | United Kingdom . |
| 2 262 100 A | 6/1993 | United Kingdom ............... C08J 3/12 |
| WO 94/00294 | 1/1994 | WIPO . |
| WO 94/06837 | 3/1994 | WIPO . |

METHOD OF FORMING A THERMOPLASTIC LAYER ON A FLEXIBLE TWO-DIMENSIONAL SUBSTRATE AND POWDER FOR PREPARING SAME

FIELD OF THE INVENTION

This invention relates to a method of forming a thermoplastic layer on a flexible, two-dimensional substrate without use of solvents and a powder for use in forming the thermoplastic layer.

BACKGROUND OF THE INVENTION

Coatings or films are applied to flexible, two-dimensional substrates for a variety of reasons. For example, outdoor-durable signs made from a flexible substrate with graphics adhered thereto often have a protective layer designed to inhibit dirt penetration into the substrate and to prevent plasticizers in the substrate from migrating outward. These layers can include a fluoropolymer, such as polyvinylidene fluoride (PVDF) to provide the dirt- and plasticizer migration-resistant properties.

Such coatings can be applied to the substrate in the form of an organic solvent-based mixture of one or more polymers that is applied using one of many known coating techniques and then dried. This approach can generate large amounts of waste solvent that are undesirable environmentally and expensive to handle. Solvent vapors must also be controlled with the use of special capital intensive equipment such as thermal oxidizers. Workers must be protected from contact with the solvents and measures must be taken to reduce the risk of explosion in the solvent environment.

The dirt- and plasticizer migration-resistant coatings can also be coated from a mixture of one or more water-based polymer latices. Addition of a surfactant to the mixture is generally required for wetting out on the substrate. In addition, the addition of one or more cosolvents can be necessary if higher molecular weight polymers are used in the mixture in order to cause the latex mixture to form a continuous film on drying. In the first case, most surfactants interfere with adhesion of ink or other decoration on the sign substrate surface and in the latter case, the addition of a cosolvent can lead to the above-described problems associated with solvent coatings. In addition, polymer latices can be immiscible with one another or with the cosolvent, leading to coagulation and difficulties in coating.

Powder coating typically involves applying a specially formulated powder to a substrate by one of several known techniques and then heating the powder in an oven in order to cause the powder to melt and flow to form the coating. The process may also include a curing step to allow a chemical reaction to occur in the coating. The result is a coating with desirable visual and functional properties. A primer may be required to achieve adequate adhesion to the substrate. This method is generally used with metal or heat resistant plastic parts because of the high temperatures that are necessary to achieve complete melting and flowing of the powder. Polymers used in powder coatings typically have a relatively low viscosity when melted so that the powder will be able to form a continuous film under the applied heat. While powder coating is a solvent-free process, it generally requires significant oven cycle times and large, energy-intensive ovens.

A common method of producing polymeric powders for powder coating is to melt and mix the desired resins in a twin screw extruder, extrude and cool the polymer mass and grind the mass to a desired size. The resulting powder, when viewed microscopically, has irregularly-shaped particles with sharp, pointed edges. These particles may exhibit low packing density when deposited on a substrate, resulting in a coating that is susceptible to voids. The irregular shapes also do not achieve the maximum charge to mass ratio as noted in U.S. Pat. No. 5,399,597 that is desirable for certain types of powder coating.

SUMMARY OF THE INVENTION

The present invention has solved the problems in the art by developing a method of forming a thermoplastic layer on a flexible, two-dimensional substrate by powder coating without the use of solvents. The method can be successfully practiced with combinations of polymers that may be chemically incompatible or unstable in processing systems such as emulsions or latices. The method provides a shortened and simplified manufacturing process by avoiding long curing ovens and convoluted web lines, instead relying on the combined application of heat and pressure to the coated substrate. The absence of solvents in the process means that capital costs for scrubbing equipment and special ventilation systems are eliminated, along with the environmental effects associated with solvent coating.

The present invention also solves problems in the art by providing a polymeric powder for preparing a thermoplastic layer that has useful properties as a protective layer on a flexible substrate for outdoor signage. Such a powder may be made by a method that results in substantially spherical powder particles. Spherical particles are expected to show advantages in flowability and coating quality over irregularly-shaped particles typically used for powder coating.

In one aspect, the present invention provides a method of forming a thermoplastic layer on a flexible substrate having two major opposing surfaces. The method comprises the following steps: a) providing a thermoplastic powder having a melt flow index of at least 0.008 grams/10 minutes; b) applying the powder to at least one major surface of the substrate to form a particle layer; and c) subjecting the substrate of step b) to elevated heat and pressure until the powder in the particle layer is fused into a continuous layer and the continuous layer is bonded to the substrate. The melt flow index of the powder is preferably in the range from 0.008 grams/10 minutes to 35 grams/10 minutes.

As used herein, "melt flow index" refers to a measure of the rate of polymer melt flow through a capillary and is measured at 190° C. according to ASTM Method D-1238 for polypropylene. The reported index is the average of three measurements. A lower melt flow index indicates a slower-flowing, more viscous polymer that is likely to be relatively high in molecular weight.

"Fused" means that the powder particles have melted at least partially and have joined with adjacent powder particles sufficiently to form a continuous layer.

"Joined" means that adjacent powder particles no longer have a distinct boundary layer when viewed under magnification.

"Continuous" means that the layer covers or surrounds the entire substrate with substantially no gaps or pin holes having a size greater than is considered acceptable for a particular application. It is not required that the continuous layer be a completely homogeneous film. The continuous layer may be formed from a monolayer of particles, or from more than one layer of stacked particles.

"Bonded" means that the bond strength between the continuous layer and the substrate is greater than the internal tensile strength of the weaker layer.

The term "thermoplastic" refers to materials that soften and flow upon exposure to heat and pressure. Thermoplastic is contrasted with "thermoset", which describes materials that react irreversibly upon heating so that subsequent applications of heat and pressure do not cause them to soften and flow. "Two-dimensional" with reference to the substrate means that the substrate is a sheet having two major opposing surfaces that is capable of passing through a nip roll configuration.

For this invention, the application of heat and pressure is preferably accomplished by passing the coated substrate through a heated nip roll configuration using readily available equipment. One skilled in the art can choose thermoplastic powder compositions that will yield useful thermoplastic layers having a variety of properties, such as dirt and stain resistance, prevention of plasticizer migration, and porosity.

In another aspect, the present invention provides a thermoplastic powder for coating on a flexible two-dimensional thermoplastic substrate. The powder comprises a (meth)acrylate polymer and a fluoropolymer, and has a melt flow index ranging from 0.008 grams/10 minutes to 0.02 grams/10 minutes. "(Meth)acrylate" refers to a polymer having either acrylate or methacrylate repeating units. The weight ratio of the (meth)acrylate polymer to the fluoropolymer is in the range from 1:1 to 99:1. This powder preferably has a particle size in the range from 10 to 50 μm. Preferably, the (meth)acrylate polymer is polymethylmethacrylate and the fluoropolymer is a copolymer of monomers comprising chlorotrifluoroethene and vinylidene fluoride. The weight ratio of chlorotrifluoroethene to vinylidene fluoride in the copolymer is about 45:55. For this powder, the weight ratio of polymethylmethacrylate polymer to fluoropolymer is preferably in the range from 2:1 to 5:1. Such a powder is preferably used in the above-described powder coating method, and is especially useful for coating on plasticized polyvinylchloride (PVC) sign substrates to form a protective layer with good properties of adhesion, weatherability, dirt resistance and plasticizer resistance.

The present invention also provides a method of making a thermoplastic powder for powder coating, comprising the steps of a) mixing together a water-based latex of a first polymer and a water-based latex of a second polymer; b) spray drying the mixture of step a) to form substantially spherical particles; and c) optionally passing the particles through a sieve. The last step may be desired for fine tuning the particle size distribution of the powder. This method is preferably used to make the (meth)acrylate polymer/fluoropolymer powder described above.

As used herein, "latex" means a dispersion of finely-sized polymer particles in a medium that comprises primarily water.

The term "substantially spherical" used to describe a particle means that the diameter of the particle is substantially the same along any axis and the particle has no apparent major or minor axis and no sharp points or edges.

In an alternative method of making a thermoplastic powder, the water-based latices of a first polymer and a second polymer are spray dried separately and the resulting substantially spherical particles are mixed together and optionally passed through a sieve.

In another aspect, the present invention provides a composite sheet material comprising a flexible, thermoplastic substrate having two major opposing surfaces and a thermoplastic layer overlying and bonded to at least one major surface of the substrate. The thermoplastic layer is continuous and comprises a fused thermoplastic powder. The powder has a melt flow index ranging from 0.008 grams/10 minutes to about 0.02 grams/10 minutes. Preferably, the composite sheet material is useful as an outdoor sign substrate, the thermoplastic layer is a protective layer having a thickness in the range from 10 μm to 25 μm and the powder comprises a (meth)acrylate polymer and a fluoropolymer.

In an alternative embodiment, the composite sheet material comprises an open-structured substrate and thermoplastic layer encasing the substrate and bonded thereto. The thermoplastic layer is a continuous layer made of a fused thermoplastic powder.

Embodiments of invention are further described with reference to the following description.

EMBODIMENTS OF THE INVENTION

Method of Producing Thermoplastic Layer

Figure 1:
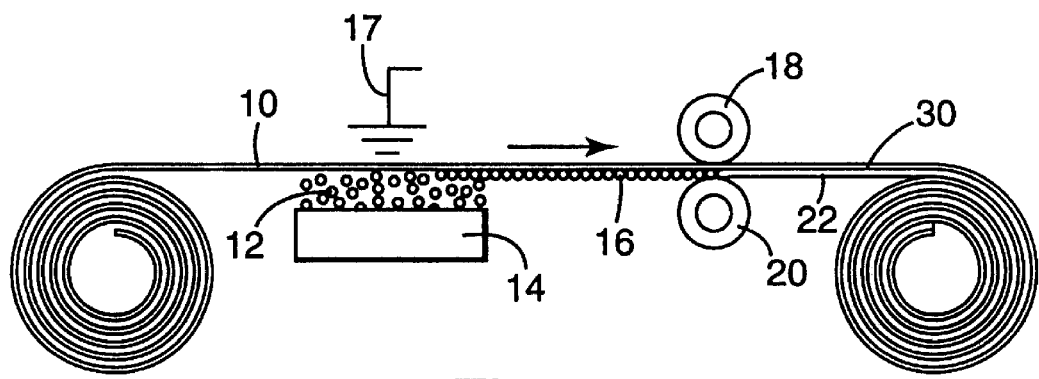
FIG. 1 is a schematic cross-sectional view of the method of producing a thermoplastic layer on a flexible substrate according to this invention.

FIG. 1 schematically illustrates a method of producing a thermoplastic layer on a flexible substrate according to this invention. Two-dimensional substrate 10 moves through powder cloud 12 emanating from electrostatic fluidized bed powder coater 14 so that a particle layer 16 is formed on one surface of the substrate. The powder particles in powder cloud 12 are shown much larger than actual size for the purposes of illustration. Substrate 10 may be in the form of a long continuous web (as shown), or it may be a smaller piece of material laid on a carrier web. In a technique well known in the art (see for example "Powder Coating", edited by Nicholas P. Liberto, published by the Powder Coating Institute, 1994, Chapter 10.), powder cloud 12 is generated by placing a powder suitable for powder coating in the chamber of the coater and passing ionized air through the powder until it fluidizes. Preferably, the powder is predried in a conditioning chamber (not shown) before entering the coater. A grounding plate 17 made of aluminum or other like material can be placed behind the substrate to provide a ground potential to attract the charged powder to the surface of the substrate. The coating weight of the particle layer 16 is controlled by the line speed, the voltage applied to the air supply, and the particle size of the powder. Both surfaces of the substrate may be coated by passing the substrate between two powder coaters, or by making two passes over the same coater and inverting the substrate between passes.

Although electrostatic fluidized bed powder coating is the preferred method for continuous coating of essentially two-dimensional substrates, other types of powder coating methods such as electrostatic spray coating may be used instead. Powder coating equipment is well known and complete systems are readily available commercially. A nonlmiting example of a powder coating equipment manufacturer is Electrostatic Technology Incorporated (ETI), Branford Conn., USA.

The coated substrate then passes through a nip configuration defined by heated roll 20 and backup roll 18. The nip configuration applies heat and pressure simultaneously to fuse the powder in the particle layer 16 into a continuous thermoplastic layer 22 and bond the layer to substrate 10, thereby forming a composite sheet material 30. No preheating stage is required prior to the nip, but such a stage may be useful to achieve a higher line speed. Heated roll 20 is typically made of metal and its outer surface is preferably covered with a material having release properties, such as poly(tetrafluoroethylene) commercially available under the tradename TEFLON from E.I. Dupont de Nemours and Co. of Wilmington, Del., to prevent the transfer of either melted thermoplastic powder or the fused thermoplastic layer from the substrate to the roll. Instead of covering the heated roll 20, the powder coated substrate can be passed through the nip on a carrier web (not shown) having release properties, such as a silicone-coated paper. In this case, the particle layer side of the substrate is placed in contact with the carrier web. Backup roll 18 preferably has a resilient surface, such as rubber.

The temperature of the heated roll is chosen to be high enough to fuse the powder into a continuous layer, yet not so high as to distort or degrade the substrate. If substrate 10 is a thermoplastic film or other material likely to soften or distort at the elevated temperatures in the nip, support should be provided to the substrate in the form of a carrier web, liner or belt system (not shown) to prevent distortion of the substrate in the heated nip configuration. The backup roll may be at ambient temperature, or it may optionally be chilled to provide further thermal protection for the substrate. The nip pressure between heated roll 20 and backup roll 18 is sufficient to fuse the heated particle layer but not so high as to distort the substrate. Skilled persons can adjust nip pressure (usually via an air pressure valve measured in kilopascals (kPa) or pounds per square inch (psi)) to achieve the desired result.

Figure 2:
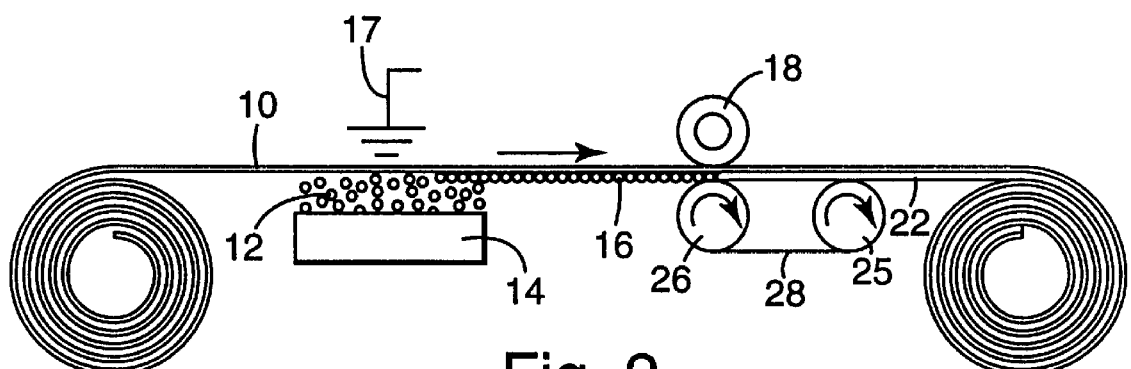
FIG. 2 is a schematic cross-sectional view of an alternate method of producing a thermoplastic layer on a flexible substrate according to this invention.

If both sides of the substrate have been coated with a particle layer, the nip configuration may alternatively comprise two heated rolls so as to fuse both particle layers in one pass. Instead of the nip configuration shown in FIG. 1, simultaneous heat and pressure may be applied by other suitable means, such as a heated press, or by the belt configuration illustrated in FIG. 2. This configuration is defined by a backup roll 18, a heated roll 26, an unheated roll 25, and an endless belt 28 passing around rolls 25 and 26. The coated substrate passes through the heated nip defined by rolls 18 and 26 while contacting belt 28. The fused continuous layer 22 thereafter remains in continuous contact with belt 28 for a period of time sufficient for the layer to solidify. Continuous layer 22 has solidified when it has sufficient dimensional stability to easily release from the belt without distorting or tearing. Belt 28 optionally may be cooled by means such as a chilled air stream (not shown) to encourage solidification. The belt can be made of any suitable material such as stainless steel, fabric reinforced TEFLON material or silicone. At the point where belt 28 passes over roll 25, the continuous layer 22 separates from the belt without sticking and remains bonded to substrate 10. The fused, coated substrate can then be taken up on a roll as shown or passed on for further coating or surface treatment.

As an alternative to the continuous coating process described above, the method may be conducted as a batch process on individual pieces of the substrate.

Substrates

Suitable substrates include any flexible two-dimensional material capable of receiving a powder coating and capable of withstanding the heat and pressure in the process described above. The substrate can be used in conjunction with a supporting liner, or internally reinforced in order to meet process requirements. As used herein, "flexible" means the substrate is capable of being bent around a radius without the formation of a permanent crease. The thickness of the substrate is in the range from about 12.7 to about 1270 microns (0.5 to 50 mil). Preferably, the range is from about 50.8 to about 762 microns (2 to 30 mil).

The substrate is preferably a thermoplastic film such as a polyester, a polyamide, a polyimide, a polycarbonate, a plasticized polymer such as PVC, a polyacrylate such as polymethylmethacrylate, a polypropylene, a polyethylene, and combinations thereof. Such a film may optionally contain additional components such as pigments, fillers, reinforcing fibers or mesh, and ultraviolet (UV) absorbing agents to provide properties dictated by the intended application. For example, a suitable substrate for use in outdoor backlit signs and awnings is a polyester mesh scrim that has been coated on both sides with a plastisol containing PVC resin, a phthalate ester plasticizer and pigment and then fused. Such a substrate is commercially available under the PANAFLEX tradename from 3M. Alternatively, a thermoplastic film substrate having a relatively low melting temperature (less than about 93° C.) can be successfully used in the above process if it is supported through the nip by a less heat sensitive carrier web such as paper or polyester. Alternatively, the substrate may be a metal sheet or foil such as aluminum, it may be paper, or it may be an open-structured material having voids extending through the thickness of the material such as a mesh, scrim, or porous membrane. If the substrate is open-structured, the thermoplastic layer may be formed so as to fill the voids partially or completely and encase the substrate, rather than lying on one surface of the substrate.

Powders

Powders suitable for powder coating in the method of this invention comprise one or more thermoplastic polymers chosen to give desirable properties in the thermoplastic layer. Such properties include weatherability, durability, dirt resistance, flexibility, toughness, adhesion to substrate, and plasticizer resistance. Nonlimiting examples of suitable thermoplastic polymers include polyvinyl chloride (PVC), polyamide, polyester, polyacrylate, polyethylene, polypropylene, and fluoropolymer. As used herein, a fluoropolymer contains at least about 10% by weight fluorine. For example, in a powder comprising polymethylmethacrylate (PMMA) and a fluoropolymer, the PMMA will provide good adhesion to a thermoplastic substrate such as PVC, and the fluoropolymer will provide good weatherability and dirt resistance. In addition, the powder can optionally include other ingredients such as plasticizers, stabilizers, flow aids to improve coating uniformity, pigments, ultraviolet (UV) absorbing agents, and extenders that are well known in the art.

The powder desirably has a combination of particle size, melt flow index, and heat stability that contributes to successful powder coating. The powder must also be fluidizable if an electrostatic fluidized bed powder coater is to be used. A powder is fluidizable if, when air is percolated through it, it is able to form a powder cloud and behave substantially like a liquid.

The particle size is preferably in the range from 10 to 200 $\mu$m, and more preferably 10 to 50 $\mu$m. Although particle sizes outside this range may also be suitable, particles smaller than 10 $\mu$m may present explosion hazards during powder coating, and particles larger than 200 $\mu$m may be difficult to charge and will produce an overly thick thermoplastic layer that is difficult to fuse.

Melt flow index should be high enough for the powder to melt and flow sufficiently upon heating, while still low enough for the resultant thermoplastic layer to have acceptable physical properties. When a heated nip is used to fuse the particle layer according to the method of this invention, powders with a relatively lower melt flow index can be used as compared to powder coatings where the powder must melt and flow under applied heat only. As previously noted however, the heated roll surface contacting the powder in the particle layer preferably has a release coating such that the powder will remain on the substrate and not adhere to the surface of the heated roll. By selecting the proper release coating for the heated roll and providing support to the incoming substrate if necessary, powders with a wide range of melt flow index values can be successfully used in the method of this invention. The melt flow index can be as low as 0.008 grams/10 minutes, and is preferably in the range from 0.008 to 35 grams/10 minutes. Polyethylene, a commonly used polymer for standard powder coating processes, has a melt flow index in the range from about 10 to 45 grams/10 minutes. The powder should be stable at the temperature that will be applied to the powder coated substrate during processing, e.g., it should not show a significant color change or other evidence of heat degradation.

Thermoplastic powders suitable for powder coating may be purchased from commercial vendors or made by one of several production methods. Examples of commercially available thermoplastic powders include DURAVIN vinyl and PVC powders and DURALON nylon powders from Thermoclad Company, polyvinylidene fluoride powder under the tradename KF POLYMER from Continental Industries, Inc., and THV-500P fluoroterpolymer powder from 3M.

Powders are commonly manufactured by either a melt-mixing or a dry—blending process, as described in D. S. Richart. "Powder Coatings" In *Kirk-Othmer Encyclopedia of Chemical Technology Third Edition,* edited by Martin Grayson, vol. 19. John Wiley and Sons, 1982. In a preferred approach, the powder is made by the following method. Each of the polymer(s) desired to be included in the powder are first prepared as a water-based latex by emulsion polymerization or a like method. The particle size of the polymer in each latex should be much smaller than the desired finished powder particle size in order to obtain the most uniform blend of the polymers in each powder particle. A range of 2 times to 1000 times smaller is useful. Preferably, the range is 50 to 300 times smaller. The latices are then mixed together using mixing equipment commonly used for latices, such as a low shear mixer. At the same time, optional additives such as ultraviolet (UV) absorbing agents, flow aids, colorants and heat stabilizers can be mixed in.

From a manufacturing standpoint, it is preferable for the various latices to be miscible with one another in the mixture. "Miscible" means that in combining the latices the dispersions are retained and coagulation does not occur. Coagulation of the various latices can sometimes be prevented by pH adjustment prior to mixing or by adding one latex to another very slowly. The resulting mixture is preferably spray dried using readily available equipment to form substantially spherical particles. Alternatively, the latices may be pumped separately into the nozzle of the spray drying apparatus so that they mix in the nozzle immediately before spray drying occurs, or the various latices may be spray dried separately and the resulting powders afterwards combined. Particles that have been previously formed by spray drying or some other method may also be metered into the latex stream at the nozzle. Suitable operating conditions for the spray drying apparatus may be determined by one skilled in the art to obtain particles within the desired size range. Although particles produced by this method are relatively uniform in size, the particles can then be optionally graded, such as by passing through sieves, to obtain a narrower size distribution.

As an alternative method to spray drying, the latex mixture described above may be dried into a solid mass by evaporation and thereafter ground into particles that are not substantially spherical.

A particularly preferred thermoplastic powder comprises a (meth)acrylate polymer and a fluoropolymer, and has a melt flow index ranging from 0.008 grams/10 minutes to about 0.02 grams/10 minutes. The weight ratio of (meth)acrylate polymer to fluoropolymer is in the range from 1:1 to 99:1. The ratio chosen will depend in part upon the properties desired in the intended application. For example, a higher proportion of (meth)acrylate polymer promotes better adhesion to a substrate, while a higher proportion of fluoropolymer imparts more dirt resistance properties and is believed to increase flexibility of the resulting thermoplastic layer. A practical weight ratio range for many applications is between 2:1 and 5:1. The particle size of the preferred powder is preferably in the range from about 10 $\mu$m to about 50 $\mu$m. Most preferably, the (meth)acrylate polymer is polymethylmethacrylate (PMMA) and the fluoropolymer is a copolymer of monomers comprising chlorotrifluoroethene and vinylidene fluoride in a weight ratio of about 45:55 chlorotrifluoroethene to vinylidene fluoride. For this powder, the weight ratio of PMMA to the fluoropolymer is in the range from 2:1 to 5:1.

A preferred polymethylmethacrylate polymer useful for the thermoplastic powder is made by Zeneca Resins of Wilmington, Mass. under the tradename NeoCryl A-550. This PMMA resin is available in latex form and has a melt flow index of 0.008465, indicating a relatively high molecular weight. The preferred fluoropolymer for the thermoplastic powder is commercially available from 3M in latex form under the tradename KEL-F 3700. The NeoCryl and KEL-F latices are compatible and stable when blended in all ratios as shown by differential scanning calorimetry (DSC) evaluation. There are literature references to the compatibility of polyvinylidene fluoride (PVDF) with polymethacrylate polymers (see for example E. M. Woo, J. M. Barlow, and D. R. Paul. *J Appl. Polym. Sci.* (30), 4243, 1985) based on glass transition temperatures of the polymer blends.

PVDF/polymethacrylate blends tend to embrittle with age because of the crystalline nature of PVDF, although attempts have been made to avoid this result. (C. Tournut, P. Kappler, and J. L. Perillon. *Surface Coatings International* (3), 99, 1995). PMMA blended with the chlorotrifluoroethene/vinylidene fluoride copolymer as described above, however, does not embrittle with age as happens when PMMA is blended with a PVDF homopolymer because of the amorphous nature of the fluorinated copolymer.

To make the preferred powder, 3 parts of the NeoCryl PMMA latex are mixed with 1 part of the KEL-F fluoropolymer latex to form a latex blend. The latex blend is preferably spray dried to form substantially spherical particles. With the proper selection of spray drying conditions such as nozzle design, air temperature, and air pressure, the desired particle size distribution of 10 to 50 $\mu$m can be obtained by a person skilled in the art of spray drying. The powder has the proper size range to be powder coated by the electrostatic fluidized bed method without further grinding, sizing or otherwise modifying the physical structure of the powder. Substantially spherical particles made by this method and comprising PMMA and the above described chlorotrifluoroethene/vinylidene fluoride copolymer are shown at 350 times magnification in FIG. 3.

At a weight ratio of 3:1 (PMMA:fluoropolymer) based on solids, the powder has a melt flow index of 0.0128 grams/10 minutes. This powder is especially preferred for use in the coating method of this invention described above. This powder is particularly useful for coating on plasticized PVC sign substrates to form a protective layer with properties of adhesion to the PVC, weatherability, dirt resistance, and as a barrier to plasticizer migration.

According to currently practiced powder coating methods, a powder with a melt flow index as low as 0.0128 would be useless because the powder would not be able to flow sufficiently under applied heat to form a continuous film. Powders having a higher melt flow index such as polyethylene are considered suitable for this type of method. If a combination of heat and pressure are employed as described by the method of the present invention, however, the powder with a low melt flow index will flow and will form a continuous layer, even on a thermoplastic substrate that is very soft at the fusion temperature of the powder.

Figure 4:
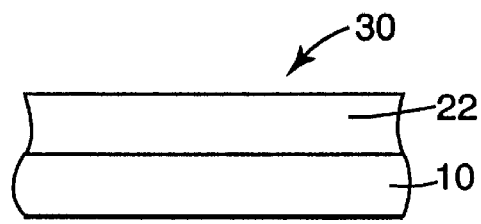
FIG. 4 is a schematic cross-sectional view illustrating the composite sheet material of this invention.

Composite sheet material 30 made according to this invention is shown in FIG. 4. Thermoplastic layer 22 overlies and is bonded to substrate 10 to form a continuous coating. In an alternative embodiment not shown in the figure, thermoplastic layer 22 can be partially or completely encasing substrate 10. This embodiment applies, for example, when the substrate is an open-structured material such as a scrim. The thermoplastic layer can be translucent, transparent or opaque in appearance, and generally has a thickness in the range from about 12 $\mu$m to about 250 $\mu$m (0.5 mil to 10 mils). An example of a protective layer for outdoor sign substrates is translucent and has a thickness in the range from 10 $\mu$m to 25 $\mu$m (0.5 mil to 1 mil). The powder used in this protective layer comprises a (meth)acrylate polymer and a fluoropolymer. The composite sheet material is useful in applications where a thermoplastic layer on a flexible substrate is desired. Examples include outdoor sign substrates.

The following nonlimiting examples provide further illustrations of the invention.

EXAMPLE 1

Preparation of a powder by mixing polymer latices, drying, and grinding the dried solid 200 grams (g) of NeoCryl A-550 water-based polymethylmethacrylate (PMMA) latex (about 40% solids, from Zeneca Resins, 730 Main St., Wilmington, Mass., 01887) was placed in a plastic container. With continuous stirring, 2 g of TINUVIN 1130 benzophenone UV absorber (Ciba-Geigy Corp., Hawthorne, N.Y., 10532) was added to the latex, followed by 2 g of TINUVIN 292 hindered amine light stabilizer (Ciba-Geigy Corp.). The mixture was stirred for two minutes, and 2 g of MODAFLOW III acrylate resin flow agent from Monsanto Co., St. Louis, Mo., 63167, was then added with stirring. The milky white mixture was stirred for two more minutes, and 100 g of KEL-F 3700 water-based fluoroelastomer latex (about 37% solids) available from 3M was then added rapidly with continued stirring. The KEL-F latex immediately caused the mixture to coagulate and form a precipitate. A slow addition of the KEL-F latex would have allowed a stable mixture to be formed. The mixture was poured into shallow pans and placed in a vented hood for about 16 hours at room temperature until the water had evaporated. The resulting solid was ground with a mortar and pestle. The ground solid was passed through sieves to obtain particles having a size of less than 50 microns ($\mu$m) (2 mils.)

EXAMPLE 2

Preparation of a powder by spray drying separate latices and combining via a powder blending operation 1 liter of NeoCryl A-550 water-based polymethylmethacrylate latex and 1 liter of KEL-F 3700 fluoropolymer latex were each spray dried into solid particles with a size range between 10 $\mu$m and 50 $\mu$m using a Bowen spray dryer equipped with a ⅜ inch two-fluid nozzle. The NeoCryl A-500 latex readily spray dried into uniformly-sized particles that flowed easily. In contrast, the fluoropolymer particles were very sticky and caused some difficulty with clogging in the nozzle tip. The fluoropolymer and the PMMA particles were combined by tumbling in a "V" mixer for one hour. The PMMA particles adhered to the fluoropolymer particles to make a flowable and fluidizable powder but at a much larger average particle size than the original powders. The combined particles were sized so that particles between 10 and 200 $\mu$m were retained.

EXAMPLE 3

Figure 3:
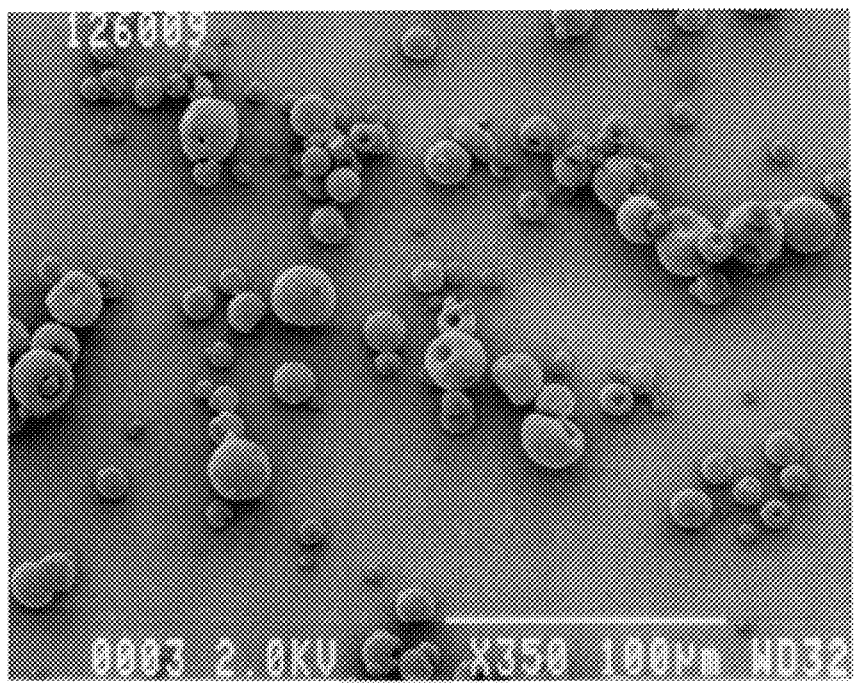
FIG. 3 is a photomicrograph at 350 times magnification of powder particles made according to the method of this invention showing their substantially spherical shape.

Preparation of a powder by spray drying a blended latex 100 g of KEL-F 3700 fluoropolymer latex was added slowly to 300 g of NeoCryl A-550 PMMA latex with slow agitation, forming a stable latex mixture with no coagulation. The mixture was then spray dried to give substantially spherical particles having a 10 $\mu$m to 50 $\mu$m particle size distribution and a melt flow index of 0.0128. These particles are shown in the photomicrograph of FIG. 3.

EXAMPLE 4

Preparation of a powder by spray drying a blended latex

NeoCryl A-550 PMMA latex and THV 530R fluoropolymer latex (available from 3M) were mixed together and were noted to form stable mixtures at weight ratios of 1:1, 2:1, and 3:1 PMMA to fluoropolymer (based on weight of solids in the latex). The two latices were mixed together with slow agitation in a 2:1 weight ratio of NeoCryl A-550 latex to THV 530R latex. The latex blend was spray dried and sized to achieve particles with a particle size distribution of between 10 $\mu$m and 50 $\mu$m.

EXAMPLE 5

Preparation of a powder from an unblended latex

NeoCryl A-550 PMMA latex was spray dried into particles having a melt flow index of 0.0085. The particles were sized to achieve a particle size distribution of between 5 $\mu$m and 45 $\mu$m.

EXAMPLES 6–10

Preparation of protective layers according to the method of this invention using powders made in Examples 1–5

For each example, powder was applied to a substrate to form a continuous protective layer as follows:

The powder was applied to 10.1 cm'15.2 cm pieces of PANAFLEX vinyl outdoor sign substrate (3M using a laboratory-scale C-30 electrostatic fluidized bed powder coater (Electrostatic Technology, Inc., Branford, Conn.) at a coating weight of approximately 2.6 milligrams per square centimeter (mg/cm$^2$). The voltage in the coater was set to give the desired coating weight (settings varied with the powder used), and the substrate was held over the coater for approximately 5 seconds. The coated substrate was then hand-fed through a nip configuration to fuse the particle layer. The nip configuration consisted of a metal-plated roll heated to 182° C. (360° F.) (except for Example 10, where heated roll was set to 191° C. (375° F.)) and an unheated backup roll with a silicone release liner threaded over the heated roll. The coated substrate was placed powder side down on the release liner and fed through the nip at an applied air pressure of about 276 kPa (40 psi) and a line speed of about 0.6 meters per minute (m/min). The resulting fused protective layer had a thickness of approximately 40 µm. The material was allowed to cool for 20 minutes, and then subjected to a stain resistance test as follows (uncoated PANAFLEX substrate was also tested in conjunction with Examples 6 and 9):

The word "TEST" was written on the protective layer surface of the material (or uncoated substrate surface) with a SANFORD Series 30000 SHARPIE Fine Point red permanent marking pen. After one minute, the sample surface was wiped with a cloth saturated with isopropyl alcohol. Any residual red stain remaining after the alcohol wipe was judged a failure of the test.

The coated material and uncoated substrate were also tested for plasticizer migration using a heat aging test as follows:

2.54 centimeter (cm) wide strips of SCOTCHCAL 3630 Series Marking Film adhered to SCOTCHCAL 3650 Series Marking Film (both available from 3M) were applied to the protective layer surface of the material. Samples of the material with the strips adhered thereon were aged for 24 hours at room temperature (22° C.) and for 1, 3, 7, 14, and 21 days at 66° C. The 180° peel strength of the strips was then measured using a Lloyd Instruments Tensile Tester 500 according to ASTM D3330-90, Test Method A in which the test surface is PANAFLEX 930 substrate from 3M with various powder coats on the surface. A solvent wipe is not required prior to testing. A peel strength value of less than 0.54 kilograms per centimeter width (kg/cm), or 3 pounds per inch width (lb/in) was considered evidence of unacceptable plasticizer migration. The materials made and test results are shown in the table below. It is apparent that the presence of the fused protective layer provides stain resistance properties and greatly improves the plasticizer resistance of the outdoor sign substrate. In the case of Example 9, though the protective layer provided some improvement in plasticizer resistance over the uncoated substrate, the adhesion values were not adequate for the intended application. In the case of Example 10, while test results were very good, the fused protective layer made the sign substrate extremely stiff so that it would be difficult to handle in large sheets. It is believed that the presence of the fluoropolymer in the protective layer adds to its flexibility.

| Example | Powder used | Stain resistance | Plasticizer migration resistance (heat aging) [kg/cm] | | | | | |
|---|---|---|---|---|---|---|---|---|
| | | | Initial | 1 day | 3 day | 7 day | 14 day | 21 day |
| uncoated substrate | | fail | 0.68 | 0.32 | 0.31 | 0.36 | 0.4 | 0.36 |
| 6 | Ex. 1 | pass | 0.85 | 0.79 | 0.88 | 0.77 | 0.68 | 0.72 |
| 7 | Ex. 2 | pass | 0.72 | 0.75 | 0.72 | 0.75 | 0.65 | 0.68 |
| 8 | Ex. 3 | pass | 0.79 | 0.82 | 0.67 | 0.63 | 0.76 | 0.66 |
| uncoated substrate | — | fail | 0.45 | 0.31 | 0.22 | 0.22 | 0.18 | 0.18 |
| 9 | Ex. 4 | pass | 0.74 | 0.49 | 0.45 | 0.45 | 0.43 | 0.4 |
| 10 | Ex. 5 | pass | 0.85 | 1.0 | 1.1 | 1.1 | 1.1 | 1.1 |

EXAMPLE 11

Preparation of protective layers according to the method of this invention, using a powder made according to this invention and a commercially available powder Each of two thermoplastic powders was used to form a thermoplastic layer on a substrate according to the method of this invention. Powder A was the powder prepared in Example 3, and powder B was VEDOC VP 188 polyester powder available from Ferro Corp., Cleveland, Ohio, 44105. Each powder was applied to a separate 10.2 cm×15.2 cm sample of PANAFLEX 930 vinyl outdoor sign substrate (3M) using a C-30 electrostatic fluidized bed powder coater (Electrostatic Technology, Inc., Branford, Conn.) to form a particle layer having a coating weight of approximately 2 mg/cm$^2$. Each sample was then fed through a nip to fuse the particle layer as described in Examples 6–10. The metal roll was heated to 182° C. (360° F.), the air pressure applied to the nip was set at about 241 kPa (35 psi) and the line speed was about 0.6 m/min. The substrates coated with Powder A and Powder B were designated as Samples 11A and 11B, respectively. The resulting thermoplastic layer made with the VP 188 powder was soft and elastic, which was unexpected considering that the VP 188 powder heated by itself in an aluminum sample dish forms a hard and brittle layer. Apparently the plasticizer in the PANAFLEX 930 substrate migrated into the polyester coating as it was being fused and softened the coating. Samples 11A and 11B were then subjected to the stain resistance test as described in Examples 6–10, while only Sample 11A was subjected to the heat aging test for plasticizer migration. Sample 11B failed the stain resistance test and therefore was not subjected to the heat aging test. Sample 11A passed the stain resistance test and also showed good plasticizer migration resistance as shown below.

| Sample | Plasticizer migration resistance (heat aging) [kg/cm] | | | | | |
|---|---|---|---|---|---|---|
| | Initial | 1 day | 3 day | 7 day | 14 day | 21 day |
| 11A | 0.63 | 0.61 | 0.61 | 0.61 | 0.61 | 0.59 |

EXAMPLE 12

Continuous coating of thermoplastic layer on substrate

A 15.2 cm wide roll of PANAFLEX 930 vinyl outdoor sign substrate (3M) was placed on an unwind stand and threaded through an opening cut in the shroud of a C-30 electrostatic fluidized bed powder coater Electrostatic Technology, Inc., Branford, Conn.). The substrate was then threaded through a nip comprising a heated roll and a backup roll and onto a windup stand. The face of the heated roll had been previously coated with a material called Rich Coat supplied by Toefco Engineering, Niles, Mich., 49120. A grounded aluminum plate was placed behind the substrate. The arrangement was similar to that shown in FIG. 1. Powder from Example 3 was then coated on the substrate with the coater voltage set at 42 kV and the substrate moving at 0.8 m/min. The coating weight was approximately 2 mg/cm$^2$. The particle layer was fused by the nip with the heated roll set at 185° C. and the applied air pressure to the nip set at 276 kPa (40 psi). After the particle layer was fused and bonded to the substrate to form the thermoplastic layer, the finished material was taken up on the windup stand.

The material was tested for stain resistance and plasticizer migration resistance as described in Examples 6–10. The material passed the stain resistance test and plasticizer migration resistance results were excellent, even after 21 days of heat aging as shown below.

| Sample | Plasticizer migration resistance (heat aging) [kg/cm] | | | | | |
|---|---|---|---|---|---|---|
| | Initial | 1 day | 3 day | 7 day | 14 day | 21 day |
| 12 | 0.76 | 0.68 | 0.70 | 0.74 | 0.68 | 0.76 |

EXAMPLE 13

Continuous coating of ionomer powder on an open scrim

Using the equipment setup described in Example 12, ABCITE 106 Neutral ionomer powder from E.I. Dupont de Nemours and Co. was placed in the coating chamber of a C-30 electrostatic fluidized bed powder coated (Electrostatic Technology, Inc.). An open-structured scrim (made by Milliken and Co., LaGrange, Ga.) was threaded through the opening in the coater. The scrim was made via a weft insertion knitting process utilizing a 70 denier polyester stitch yarn, an 840 denier polyester warp yarn, and a 1000 denier polyester weft yarn knit to achieve a scrim density of 0.0203 lbs per cubic inch. The voltage of the C-30 coater was set to 67 kV to give the maximum particle layer coating weight without powder falling from the scrim after the scrim left the powder coating chamber. The scrim was coated at a line speed of about 1.2 m/min (4 fpm). The heated roll was set at 188° C. (370° F.) and the air pressure applied to the nip was about 276 kPa (40 psi). After emerging from the nip, the fused thermoplastic layer had fully covered the surface area of the scrim and partially filled the voids between the yarns. The coated scrim was then passed through the coating system again at the same conditions. After the second pass, a continuous composite sheet (having no visible voids) was formed with the fused thermoplastic layer completely encasing the scrim.

The invention is not limited to these embodiments. The claims follow.

What is claimed is:

1. A method of forming a thermoplastic layer on a flexible substrate having two major opposing surfaces comprising the steps of:

a) providing a thermoplastic powder having a melt flow index of at least 0.008 grams/10 minutes and comprising a (meth)acrylate polymer and a fluoropolymer, wherein the weight ratio of the (meth)acrylate polymer to the fluoropolymer ranges from 1:1 to 99:1;

b) applying the powder in absence of solvents to at least one major surface of the substrate to form a particle layer; and c) subjecting the substrate of step b) to elevated heat and pressure until the powder in the particle layer is fused into a continuous layer that is bonded to the substrate, wherein the heat and pressure of step c) are applied simultaneously by passing the coated substrate through a heated nip configuration comprising a heated roll having an outer surface and a backup roll.

2. The method of claim 1, wherein the thermoplastic powder has a melt flow index in the range from 0.008 grams/10 minutes to 35 grams/10 minutes.

3. The method of claim 1, wherein the substrate is a thermoplastic film.

4. The method of claim 1, wherein the substrate is an open-structured material.

5. The method of claim 1, wherein the thermoplastic powder has a melt flow index of less than about 0.02 grams/10 minutes.

6. The method of claim 5, wherein the (meth)acrylate polymer is polymethylmethacrylate and the fluoropolymer is a copolymer of monomers comprising chlorotrifluoroethene and vinylidene fluoride, wherein the weight ratio of chlorotrifluoroethene to vinylidene fluoride is about 45:55.

7. The method of claim 1, wherein the heated nip configuration further comprises an unheated roll proximate to the heated roll and a belt passing around the heated roll and the unheated roll such that after the coated substrate passes between the heated roll and the backup roll, the belt contacts the continuous layer for a period of time sufficient for the continuous layer to solidify.

8. The method of claim 1, wherein the heated roll comprises a release coating covering the outer surface.

9. The method of claim 1, wherein the coated substrate is supported by a carrier web through the heated nip configuration.

10. The method of claim 1, wherein the powder is applied by electrostatic fluidized bed powder coating.

11. A composite sheet material comprising a flexible, thermoplastic substrate having two major opposing surfaces and a thermoplastic layer overlying and bonded to at least one major surface of the substrate, the thermoplastic layer comprising a continuous layer of a thermoplastic powder fused via heat and pressure, wherein the powder has a melt flow index ranging from 0.008 grams/10 minutes to about 0.02 grams/10 minutes, wherein the powder comprises a (meth)acrylate polymer and a fluoropolymer.

12. The composite sheet material of claim 11, wherein the thermoplastic layer is a protective layer having a thickness in the range from 10 μm to 25 μm.

* * * * *